United States Patent
Momiyama

(10) Patent No.: US 11,502,578 B2
(45) Date of Patent: Nov. 15, 2022

(54) ELECTRIC WORKING MACHINE

(71) Applicant: YAMABIKO CORPORATION, Ohme (JP)

(72) Inventor: Hiroshi Momiyama, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 113 days.

(21) Appl. No.: 17/153,216

(22) Filed: Jan. 20, 2021

(65) Prior Publication Data

US 2021/0234431 A1    Jul. 29, 2021

(30) Foreign Application Priority Data

Jan. 24, 2020  (JP) .............................. JP2020-010307

(51) Int. Cl.
*H02K 7/14* (2006.01)
*H02K 9/06* (2006.01)
(Continued)

(52) U.S. Cl.
CPC ............. *H02K 7/145* (2013.01); *B25F 5/008* (2013.01); *H02K 5/207* (2021.01); *H02K 9/06* (2013.01);
(Continued)

(58) Field of Classification Search
CPC ........ H02K 7/145; H02K 11/33; H02K 5/207; H02K 9/00; H02K 9/02; H02K 9/04;
(Continued)

(56) References Cited

U.S. PATENT DOCUMENTS 6,127,751 A * 10/2000 Kristen .................... H02K 7/14
173/117
2004/0124721 A1   7/2004 Pfisterer et al.
(Continued)

FOREIGN PATENT DOCUMENTS

DE    102012103935 A1   11/2013
EP       1398865 A2    3/2004
(Continued)

OTHER PUBLICATIONS

Hayashizaki et al, Electric Working Machine, Sep. 16, 2010, JP 2010200673 (English Machine Translation) (Year: 2010).*
(Continued)

*Primary Examiner* — Alexander A Singh
(74) *Attorney, Agent, or Firm* — Crowell & Moring LLP

(57) ABSTRACT

An electric working machine capable of efficiently cooling components disposed inside, as well as simplifying assembling work and reducing man-hours and production cost. A motor, control board for controlling the motor, rod fixture secured to the front side of the motor, and air guiding partitioning member secured to the rear side of the motor form a motor assembly. The air guiding partitioning member includes a partitioning plate hermetically partitioning between air exhaust and intake ports provided with a predetermined interval longitudinally in the body casing. The partitioning plate has an air guiding window for delivering cooling air taken in from the air intake port to an opening for sucking air on the front side of the motor through a space between the motor and body casing. The control board is disposed on the rear side of the partitioning plate.

7 Claims, 19 Drawing Sheets

(51) Int. Cl.
*H02K 11/33* (2016.01)
*H02K 5/20* (2006.01)
*B25F 5/00* (2006.01)
*A01D 34/416* (2006.01)
*A01D 101/00* (2006.01)
*A01G 3/053* (2006.01)
*A01G 3/08* (2006.01)
*A01G 3/04* (2006.01)
*B25F 3/00* (2006.01)

(52) U.S. Cl.
CPC ............ *H02K 11/33* (2016.01); *A01D 34/416* (2013.01); *A01D 2101/00* (2013.01); *A01G 3/053* (2013.01); *A01G 3/086* (2013.01); *A01G 2003/0461* (2013.01); *B25F 3/00* (2013.01); *H02K 2211/03* (2013.01)

(58) Field of Classification Search
CPC .. H02K 9/06; H02K 9/08; H02K 9/10; H02K 9/12; H02K 9/14; H02K 9/16; H02K 9/18; H02K 9/22; H02K 9/227; H02K 2211/03; H02K 1/20; H02K 5/20; B25F 5/008; B25F 3/00; A01G 3/086; A01G 3/053; A01G 2003/0461; A01D 2101/00; A01D 34/416; A01D 34/6818

USPC ...... 310/47, 50, 52, 53, 55, 57, 58, 59, 60 r, 310/62, 63, 64

See application file for complete search history.

(56) References Cited

U.S. PATENT DOCUMENTS

| | | | |
|---|---|---|---|
| 2008/0106159 A1* | 5/2008 | Yoshida | B25F 5/008 310/64 |
| 2010/0218385 A1 | 9/2010 | Mang et al. | |
| 2014/0265664 A1* | 9/2014 | Camilleri | H02K 9/14 310/59 |
| 2016/0079824 A1* | 3/2016 | McKinzie | H02K 9/227 310/58 |
| 2017/0248147 A1* | 8/2017 | Ueda | F04D 17/16 |

FOREIGN PATENT DOCUMENTS

| | | | |
|---|---|---|---|
| JP | 2010200673 A | * | 9/2010 |
| WO | WO 2016/002542 A1 | | 1/2016 |

OTHER PUBLICATIONS

Extended European Search Report in Europe Application No. 21152015.0, dated Jun. 22, 2021, 4 pages.

* cited by examiner

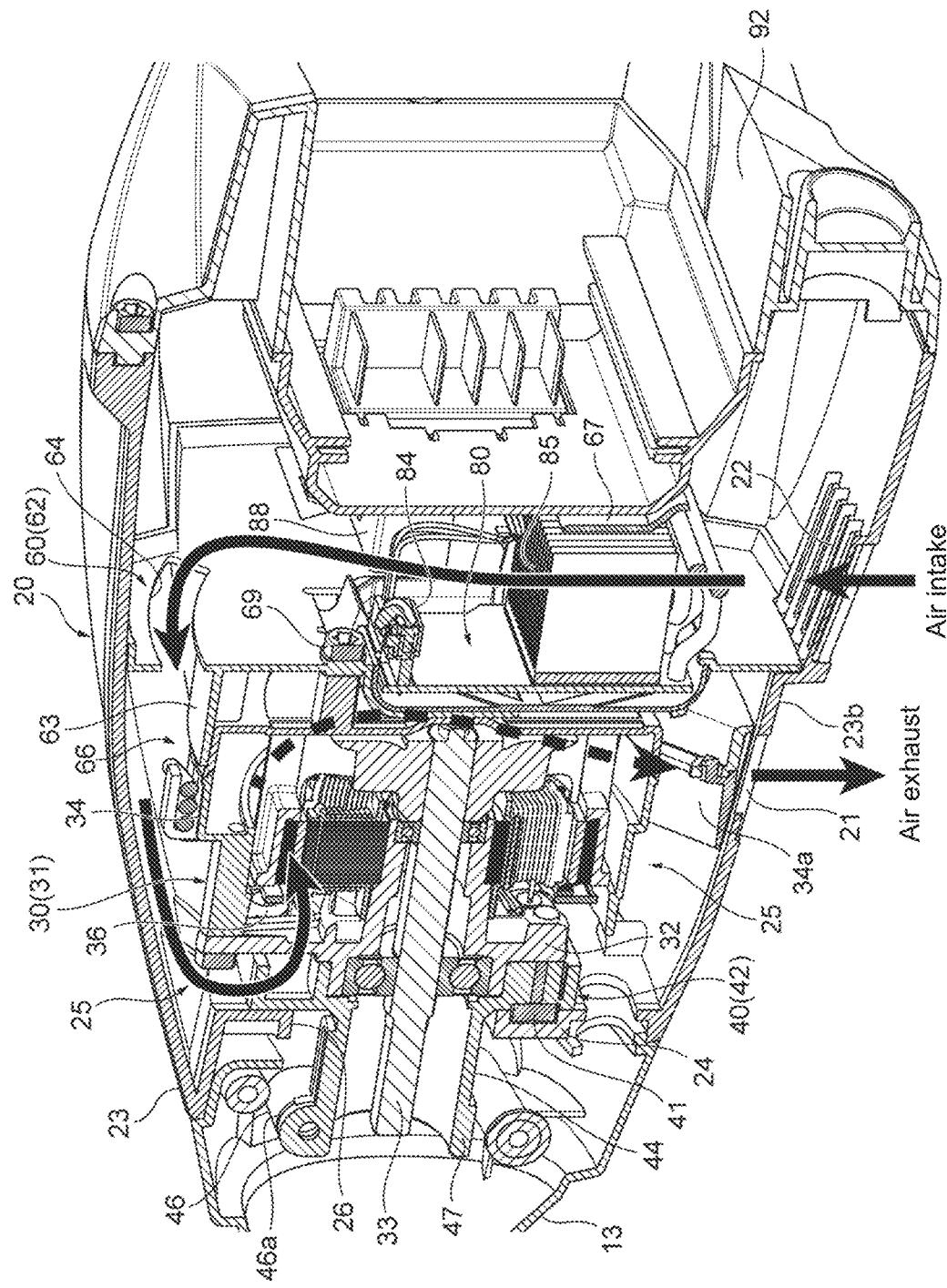

ELECTRIC WORKING MACHINE

RELATED APPLICATIONS

This application claims priority to Japanese Patent Application No. 2020-010307, filed on Jan. 24, 2020, the entire content of which is incorporated herein by reference.

BACKGROUND OF THE INVENTION

1. Field of the Invention

The present disclosure relates to an electric working machine driven by an electric motor to be operated, such as a bush cutter, hedge trimmer, and chain saw.

2. Description of the Related Art

Portable electric working machines driven by an electric motor (hereinafter simply referred to as a motor) to be operated typically include a motor as the driving source for operation, a control board for controlling the motor or the like, battery, and the like disposed inside a body casing. The temperature inside the body casing (generated heat amount of components disposed inside thereof) is comparatively lower than that of working machines driven by an engine, but is still likely to become high in some cases. When the temperature inside the body casing becomes high, the components disposed inside are likely to deteriorate. Therefore, as disclosed in US 2010/0218385 A1 or the like, approaches have conventionally been taken, such as, with a cooling fan provided in the motor, sucking the outer air into the body casing to avoid heat stagnant inside and blowing cooling air onto the components supposed to have a high temperature.

SUMMARY OF THE INVENTION

However, in the conventional electric working machines, a high-temperature air to be exhausted from the body casing mixes with a low-temperature cooling air taken into the body casing. Thus, their cooling performance has not been efficient.

Further, the components such as the motor are individually attached to the body casing, which has raised another problem of requiring labor and time for assembling work.

In view of the foregoing, the present disclosure provides an electric working machine capable of efficiently cooling the components disposed inside, as well as simplifying the assembling work and reducing the man-hours and production cost.

Considering the foregoing, the electric working machine according to the present disclosure basically includes a motor as the driving source for operation, a body casing in which the motor is disposed in the longitudinal direction, an operating rod provided with a working part, and a rod fixture for securely attaching the operating rod to the body casing.

Further, the motor, the control board for controlling the motor, the rod fixture secured to the front side of the motor, and an air guiding partitioning member secured to the rear side of the motor form a motor assembly. The air guiding partitioning member includes a partitioning plate that hermetically partitions between an air exhaust port and an air intake port provided with a predetermined interval in the longitudinal direction in the body casing, the partitioning plate provided with an air guiding window for delivering cooling air taken in from the air intake port to an opening for sucking air on the front side of the motor through a space between the motor and the body casing. The control board is disposed on the rear side of the partitioning plate.

In some embodiments, the air exhaust port and the air intake port are provided on a bottom of the body casing in the longitudinal direction, and the air guiding window is provided in the upper portion of the partitioning plate.

In some embodiments, the electronic components that are supposed to have a high temperature are mounted in a lower portion of the control board, and a guide member with a widened and open lower portion is provided in the control board to allow more cooling air taken in from the air intake port to flow through the electronic components that are supposed to have a high temperature.

In another embodiment, the guide member is integrally formed with the partitioning plate.

In yet another embodiment, the air guiding partitioning member includes a recessed housing that covers at least part of a fan case provided in a rear portion of the motor.

In still another embodiment, the body casing has a single cylindrical body with an open front end and an open rear end and with a partitioning wall portion that partitions the inside of the body casing into a front portion and a rear portion. The rod fixture includes a mounting base disposed behind the partitioning wall portion and is securely fastened to the partitioning wall portion, with at least one bolt screwed from the front side to the rear side of the partitioning wall portion through a through-hole provided in the partitioning wall portion, and a tubular fixture for securing the proximal end of the operating rod, the tubular fixture projecting from the mounting base toward the front of the partitioning wall portion through an insertion hole provided in the partitioning wall portion.

In the electric working machine according to the present disclosure, the motor, control board, rod fixture, and air guiding partitioning member are integrally formed as a motor assembly as a single article. This can simplify and accelerate the assembling work.

In addition, with the air guiding partitioning member partitioning the air exhaust port and the air intake port, a high-temperature exhaust air is unlikely to mix with a low-temperature intake air. Further, the control board is disposed on the rear side of the partitioning plate to allow the cooling air from the air intake port to be easily blown onto the electronic components that are supposed to have a high temperature. Thus, the control board can be efficiently cooled and the electronic components (such as the capacitor) mounted on the control board are less likely to deteriorate due to the heat.

BRIEF DESCRIPTION OF THE DRAWINGS

FIG. 19 is an overall longitudinal cross-sectional view for explaining an air flow in the body of the electric working machine illustrated in FIG. 1.

DETAILED DESCRIPTION OF THE PREFERRED EMBODIMENTS

An exemplary embodiment of the present disclosure will be described below with reference to the drawings.
[Configuration of Electric Working Machine]

Figure 1:
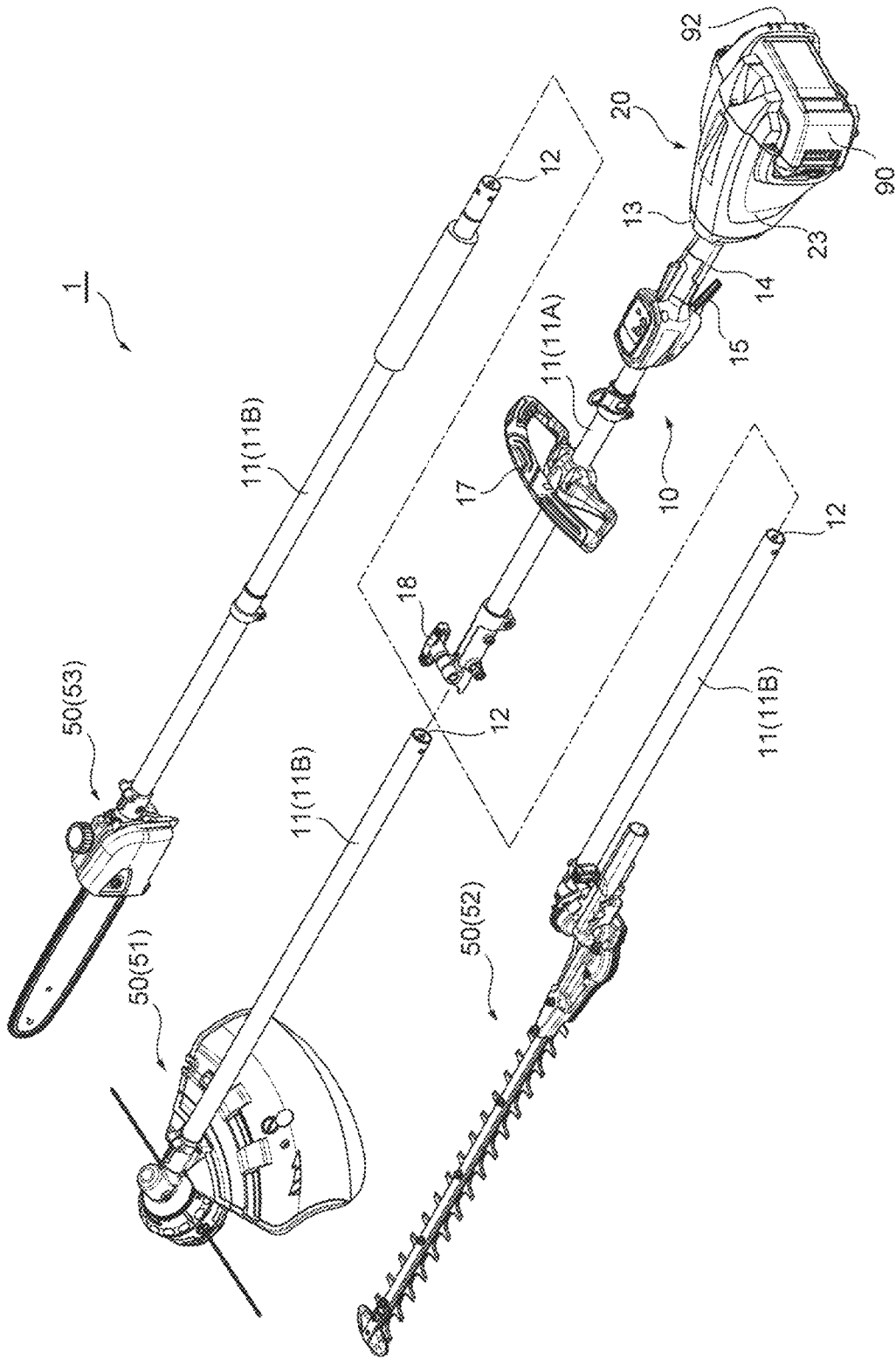
FIG. 1 is a perspective view of a common machine body and three types of exchangeable working parts of an embodiment of an electric working machine according to the present disclosure.
Figure 2:
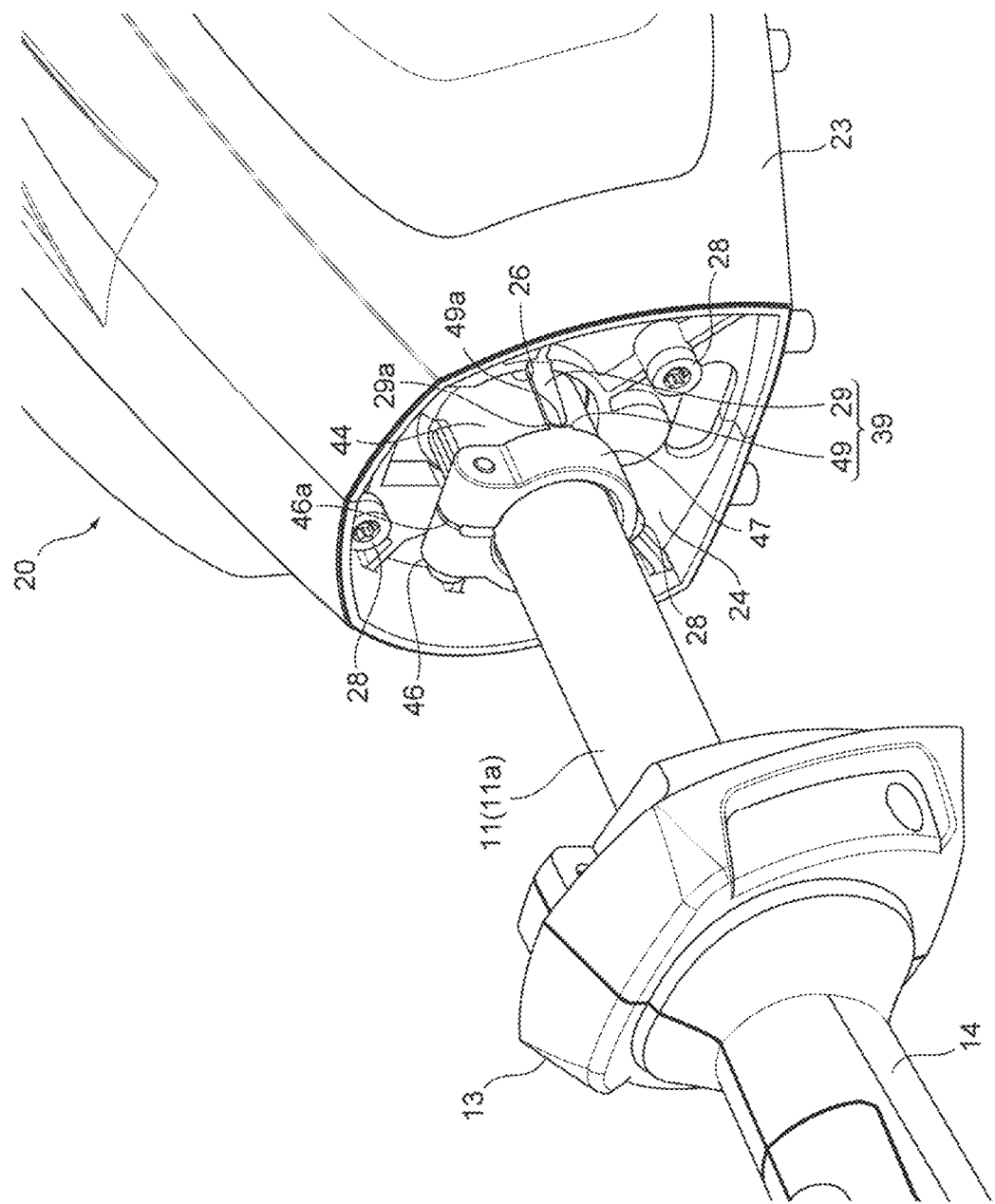
FIG. 2 is a perspective view showing the inside of the electric working machine illustrated in FIG. 1 with a cap removed from the front end of a body casing.
Figure 3:
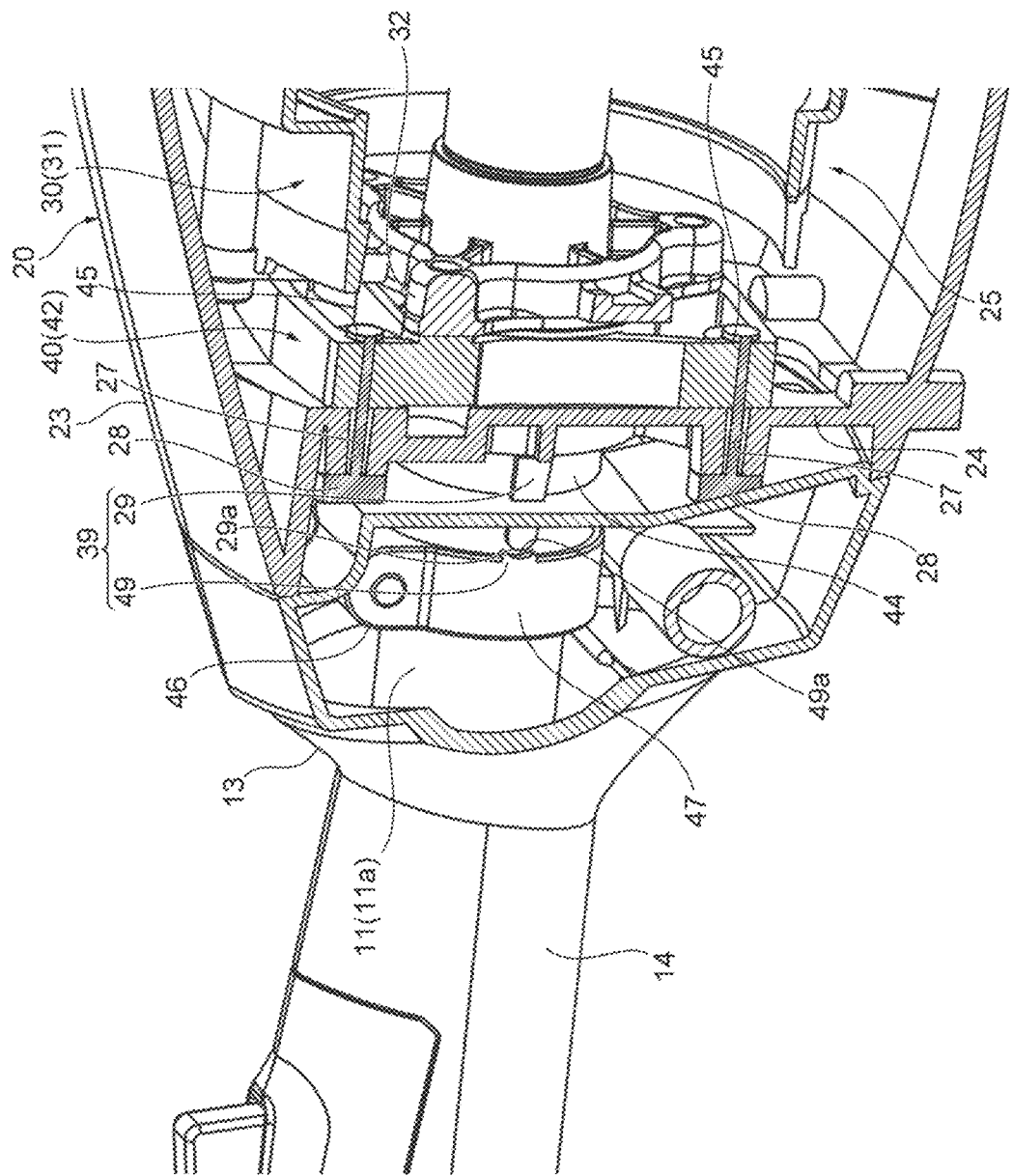
FIG. 3 is a perspective view showing the inside of the electric working machine illustrated in FIG. 1 as viewed from a cut-out portion near the proximal end of an operating rod and a cut-out front portion of the body casing.
Figure 4:
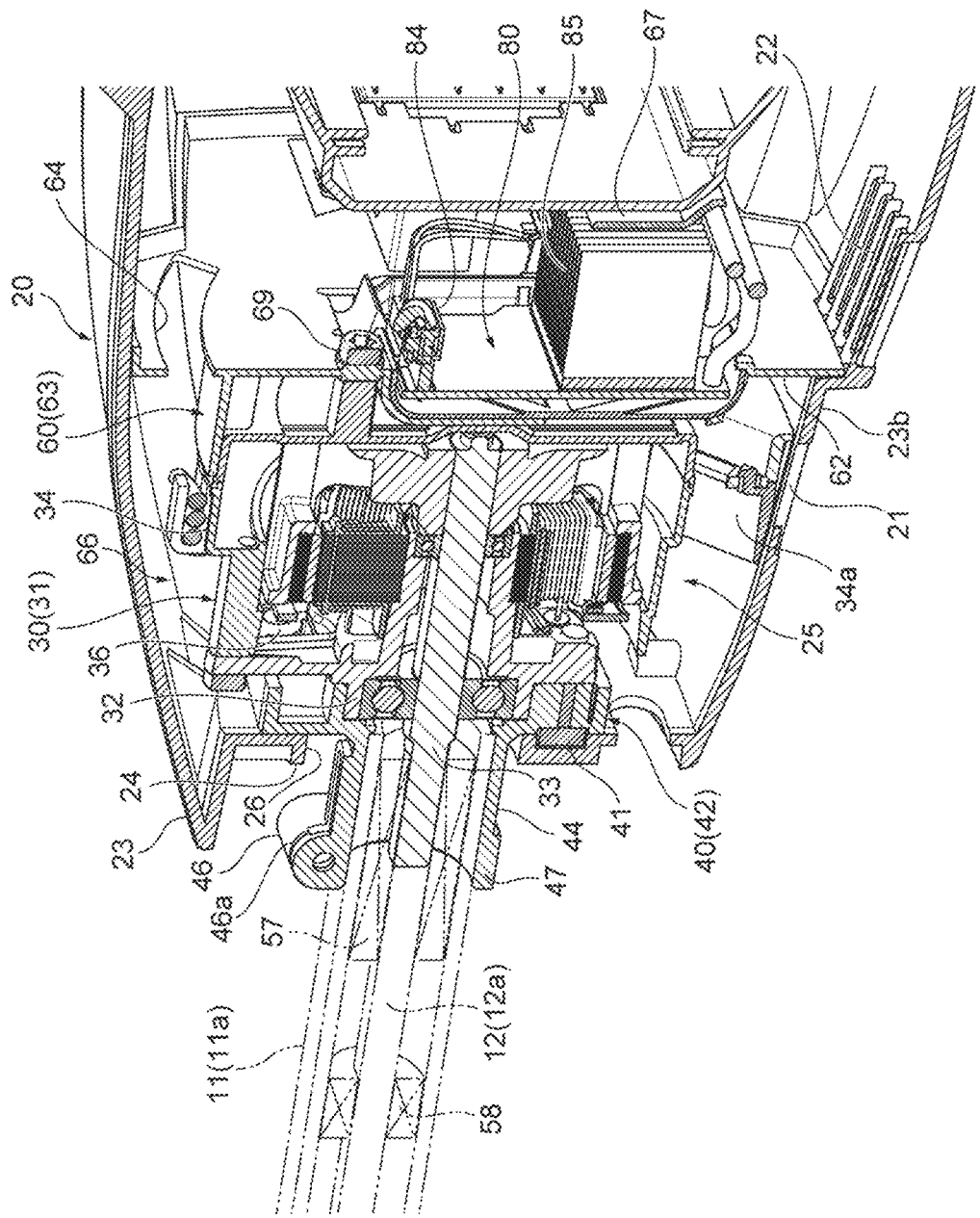
FIG. 4 is a longitudinal cross-sectional view of the proximal end of the operating rod and the front half portion of a body of the electric working machine illustrated in FIG. 1.
Figure 5:
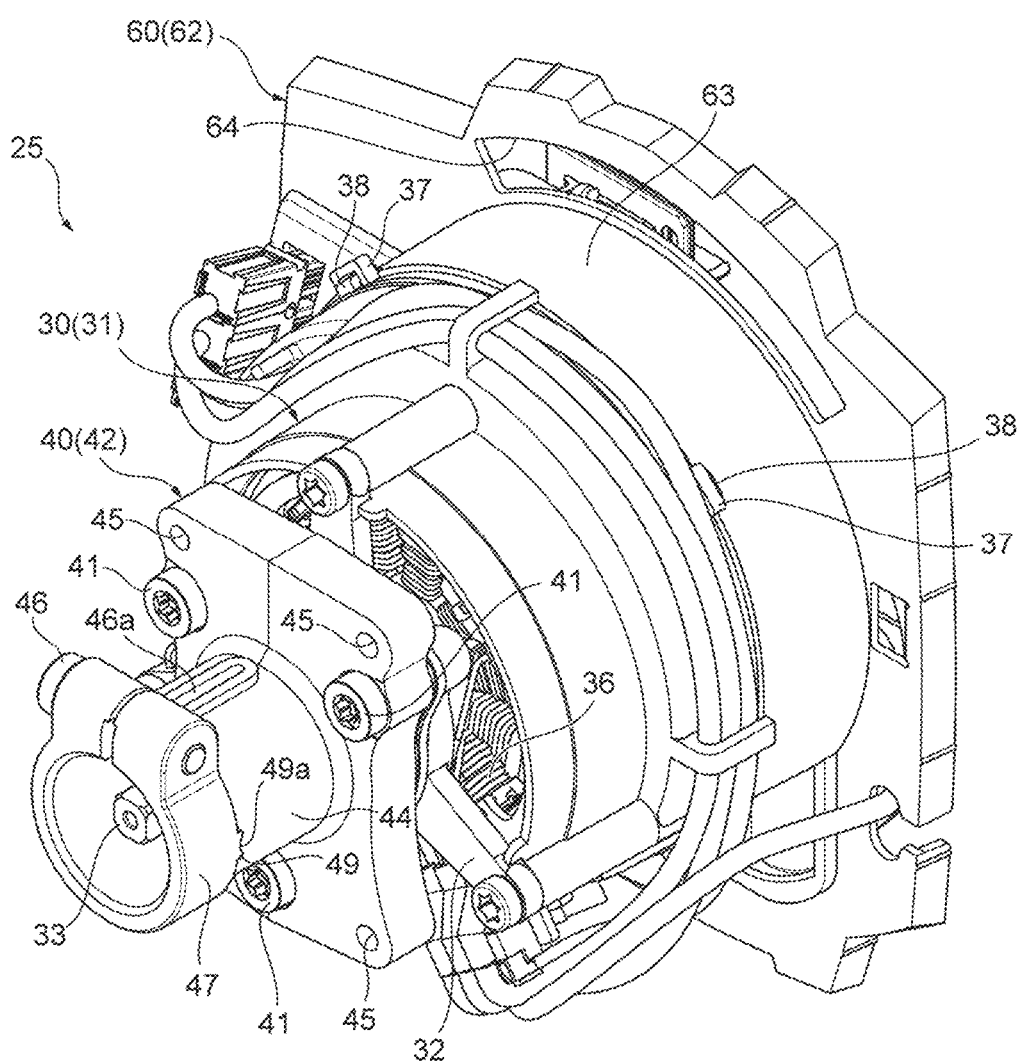
FIG. 5 is a perspective view of a motor assembly illustrated in FIG. 4 as diagonally viewed from the front side.
Figure 6:
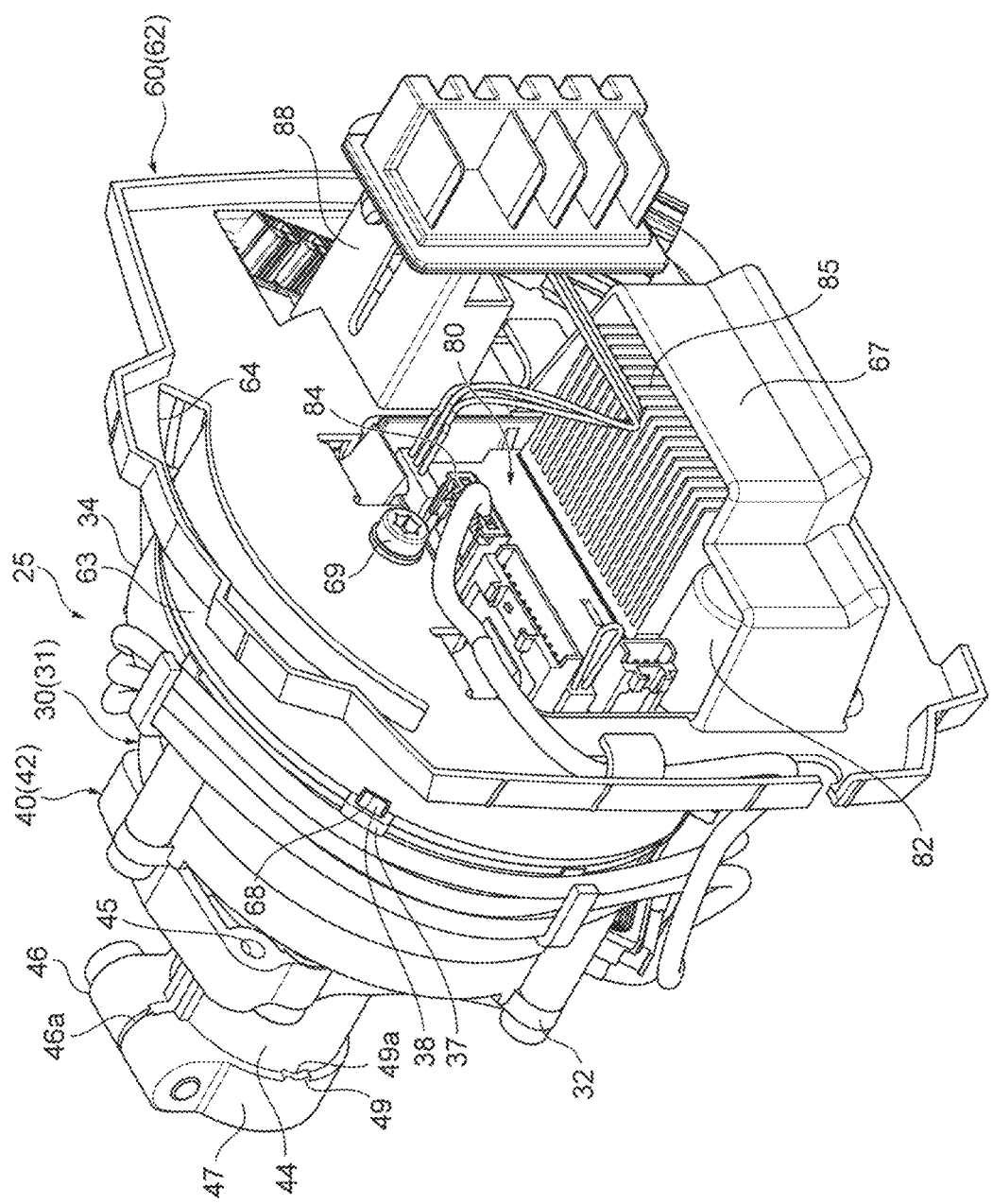
FIG. 6 is a perspective view of the motor assembly illustrated in FIG. 4 as diagonally viewed from the rear side.
Figure 7:
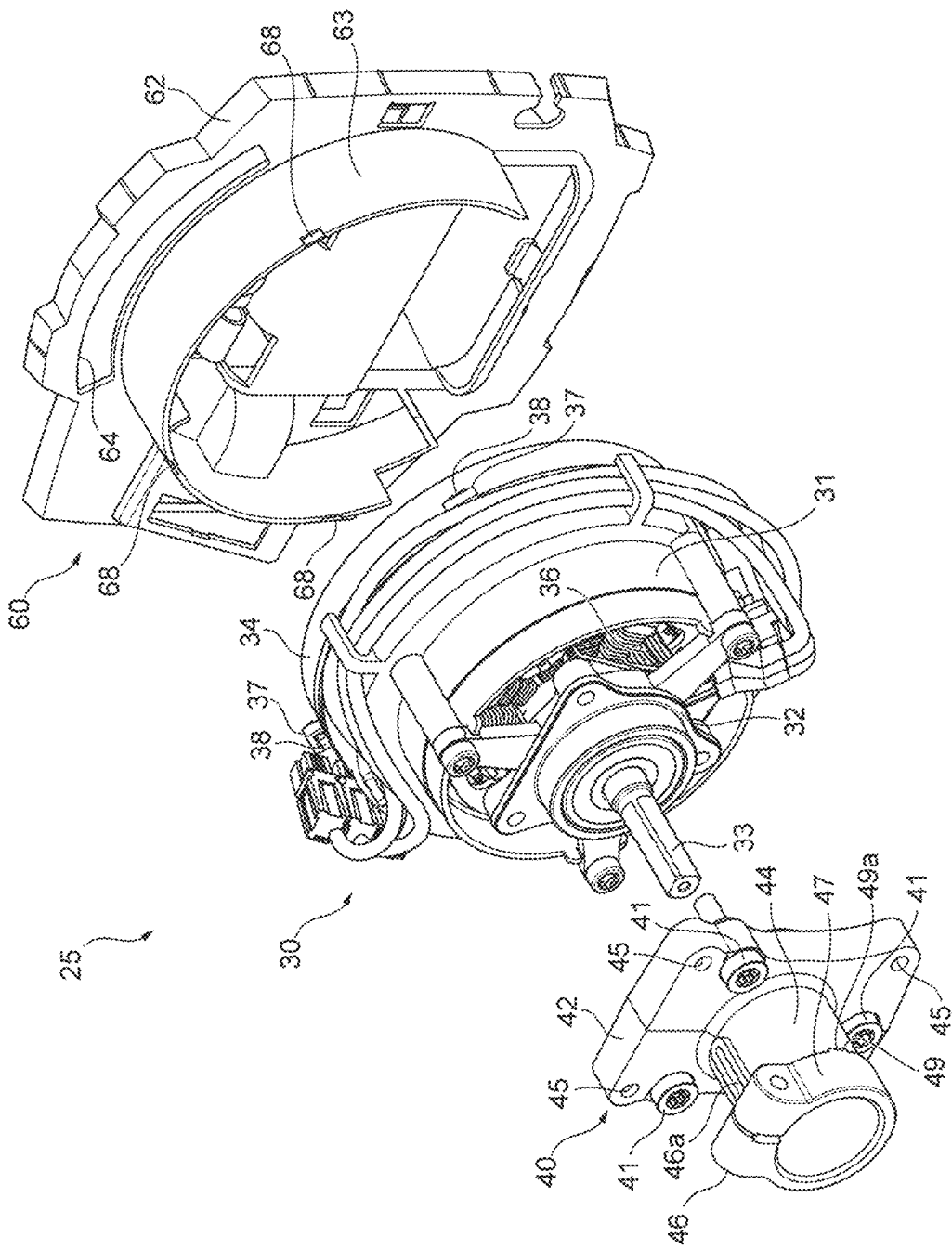
FIG. 7 is an exploded perspective view of a rod fixture, a motor, and an air guiding partitioning member that form the motor assembly illustrated in FIG. 4 as diagonally viewed from the front side.
Figure 8:
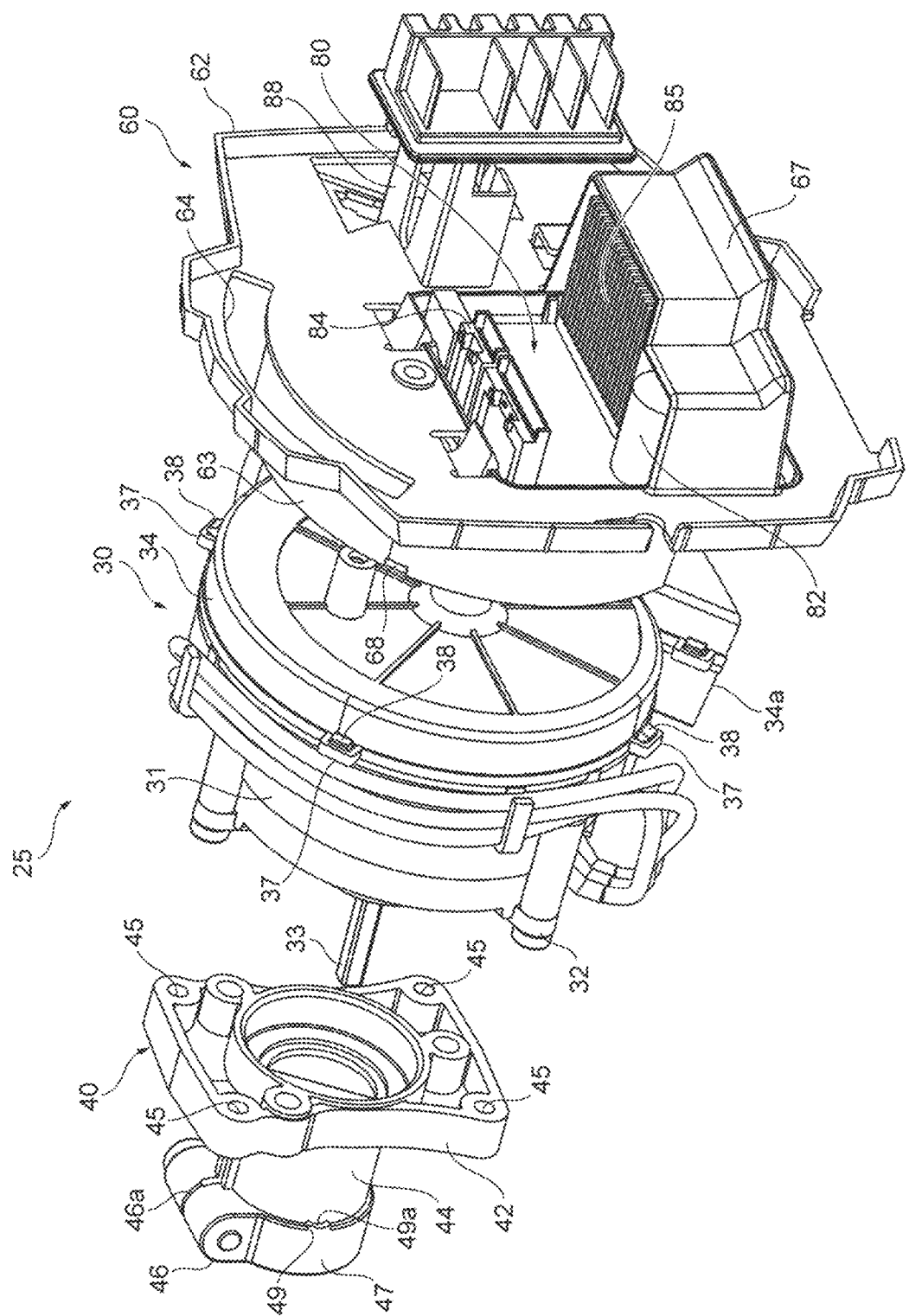
FIG. 8 is an exploded perspective view of the rod fixture, the motor, a control board, and the air guiding partitioning member that form the motor assembly illustrated in FIG. 4 as diagonally viewed from the rear side.

FIG. 1 is a perspective view of a common machine body 10 and three types of exchangeable working parts (also referred to as attachments) 50 (51, 52, and 53) of an electric working machine 1 of an embodiment according to the present disclosure. FIG. 2 is a perspective view showing the inside of the electric working machine 1 illustrated in FIG. 1 with a cap 13 removed from the front end of a body casing 23. FIG. 3 is a perspective view showing the inside of the electric working machine 1 illustrated 1 in FIG. 1 as viewed from a cut-out portion near a proximal end 11a of an operating rod 11 and a cut-out front portion of the body casing 23. FIG. 4 is a longitudinal cross-sectional view of the proximal end 11a of the operating rod 11 and the front half portion of a body 20 of the electric working machine 1 illustrated in FIG. 1.

The electric working machine 1 in the illustrated embodiment includes the common machine body 10 with a motor 30 as the driving source for operation and working parts 50 (51, 52, and 53) removably attached to the common machine body 10. The common machine body 10 includes the body 20 and the operating rod 11 (specifically, a main operating rod 11A that forms the root portion or rear half portion of the operating rod 11). The body 20 has the synthetic resin body casing 23. The body casing 23 has a single cylindrical body widened from the front end side toward the rear end side (rearward) with open front and rear ends. The motor 30 is disposed inside the body casing 23 in the longitudinal direction. The operating rod 11 is a straight pipe and the proximal end thereof is securely attached to the front end of the body 20. A cap 13 covering the front end of the body casing 23, a grip 14, a handle lever 15, and the like are integrally and externally disposed around the proximal end of the operating rod 11, and a fan-shaped loop handle 17 is attached on their front side.

A power transmission shaft 12 supported by a bearing 58 (FIG. 4) extends through the center of the operating rod 11. The transmission shaft 12 is adapted to transmit the rotary driving force of the motor 30 to the working part 50 provided at the distal end of the operating rod 11.

The working part 50 includes several types of exchangeable working parts (attachments) 51, 52, and 53 (only three types of those shown herein). In the illustrated example, the working part 51, working part 52, and working part 53 function as a bush cutter, hedge trimmer, and chain saw, respectively. The working parts 51, 52, and 53 each have the operating rod 11 (specifically, a removable operating rod 11B that forms the distal end portion or front half portion of the operating rod 11) and the power transmission shaft 12, and are optionally removable by means of a coupling fixture 18 and a power transmission connector (not shown) that are provided at the distal end of the main operating rod 11A.

A partitioning wall portion 24 is provided inside and near the front end of the cylindrical body casing 23. The partitioning wall portion 24 partitions the inside of the body casing 23 into front and rear portions. A motor assembly 25 as shown in FIG. 5 to FIG. 8 is securely attached to the partitioning wall portion 24. The motor assembly 25 includes four components integrally formed, which are the motor 30, a control board 80 for controlling the motor 30 or the like, a rod fixture (also referred to as a fixture) 40 for securely attaching the proximal end 11a of the operating rod 11 to the body casing 23, and an air guiding partitioning member 60.

The motor 30 includes a short cylindrical body 31. A base 32 with a bearing is secured to the front side of the short cylindrical body 31. A rotary drive shaft 33 projects toward the front from the base 32. A fan case 34 is provided on the rear side of the short cylindrical body 31 so as to cover a cooling fan (vane) provided in the rear portion of the rotary drive shaft 33. Herein, the short cylindrical body 31 and the fan case 34 are attached together by locking gate-like engagement pieces 37 provided in the front end of the fan case 34, with hooks 38 provided (directed to the rear) at four locations in the rear end of the short cylindrical body 31. A lower portion of the fan case 34 forms an air outlet 34a directed toward an air exhaust port 21 provided in the body casing 23. The portion excluding the base 32 on the front side of the short cylindrical body 31 in the motor 30 forms an opening 36 for the cooling fan for sucking air.

The rod fixture 40 (a mounting base 42 thereof) is securely fastened, with three bolts 41, to the base 32 (that is, front side) of the motor 30. The rod fixture 40 includes a rectangular thick plate-like mounting base 42 and a tubular fixture 44. The mounting base 42 is disposed behind the partitioning wall portion 24 of the body casing 23 so as to be pressed against the partitioning wall portion 24 of the body casing 23 from the rear side and is securely fastened to the partitioning wall portion 24, with four bolts 28 screwed from the front side to the rear side of the partitioning wall portion 24 through through-holes 27 provided at four locations of the partitioning wall portion 24. The tubular fixture 44 for securely fastening the proximal end 11a of the operating rod 11 projects from the center of the mounting base 42 toward the front of the partitioning wall portion 24 through a key-shaped insertion hole 26 provided in the partitioning wall portion 24. The tubular fixture 44 is configured with an anchor bolt-type fastener 46 having a slit cut-out portion 46a on its upper side. Screw holes 45 into which the four bolts 28 are screwed are provided at four corners of the mounting base 42.

The power transmission shaft 12 disposed inside the operating rod 11 is securely coupled, at its proximal end 12a, to the rotary drive shaft 33 of the motor 30 disposed inside the tubular fixture 44 via a coupling 57 (see FIG. 4).

The present embodiment additionally includes a configuration as described below, so that in assembling the electric working machine 1 (common machine body 10 thereof), the tubular fixture 44 and the insertion hole 26 of the partitioning wall portion 24 (operating rod 11) are coaxially arranged and the through-holes 27 of the partitioning wall portion 24 for inserting the four bolts 28 and the screw holes 45 of the mounting base 42 into which the bolts 28 are screwed are coaxially arranged.

Specifically, a temporarily securing mechanism 39 is provided for retaining the position of the motor assembly 25 by automatically moving the motor assembly 25 in the rotating direction and two orthogonal directions on a plane along (parallel to) the partitioning wall portion 24 relative to the body casing 23, when the mounting base 42 is disposed behind the partitioning wall portion 24 so as to allow the tubular fixture 44 to project toward the front of the partitioning wall portion 24 through the insertion hole 26 of the partitioning wall portion 24 and simultaneously, the mounting base 42 is pressed against the partitioning wall portion 24 from the rear side, prior to finally securing the mounting base 42 of the rod fixture 40, with the four bolts 28, to the partitioning wall portion 24 in the motor assembly 25.

The temporarily securing mechanism 39 specifically includes a plurality of fitting pieces 49 and 49 (herein a left and right pair of fitting pieces) and a left and right pair of bracing pieces 29 and 29. The fitting pieces 49 and 49 are spaced from each other with a predetermined angle (herein, 180 degrees) in a thick portion (flange portion) 47 (rear face thereof) formed in the front end of the tubular fixture 44 (that is, a portion of the tubular fixture 44 projecting toward the front of the partitioning wall portion 24). The bracing pieces 29 and 29 corresponding to the left and right pair of fitting pieces 49 and 49 are provided on the periphery of the insertion hole 26 of the partitioning wall portion 24.

The rear faces of the left and right pair of fitting pieces 49 and 49 form fitting recesses 49a and 49a in an elliptic arc or a mountain shape as viewed from the side that are recessed forward.

Figure 13:
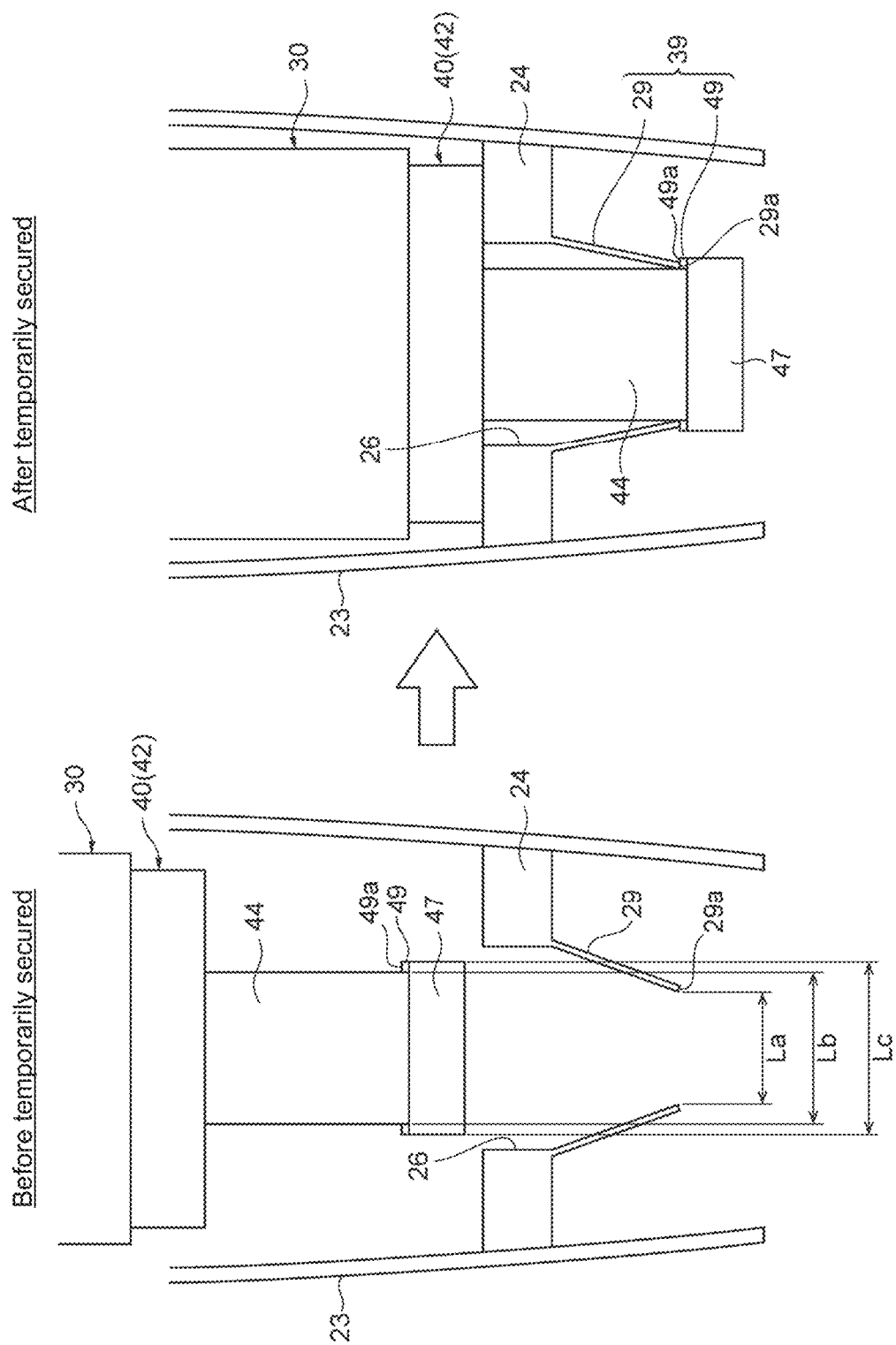
FIG. 13 shows schematic views for explaining the configuration of a temporarily securing mechanism illustrated in FIG. 9.

The distal ends (faces) of the left and right pair of bracing pieces 29 and 29 form fitting projections 29a and 29a in an elliptic arc or a mountain shape as viewed from the side that can fit into the fitting recesses 49a and 49a of the fitting pieces 49 and 49. Herein, as shown in the drawing on the left side of FIG. 13, the left and right pair of bracing pieces 29 and 29 project diagonally forward (inclined inward) in a mirror symmetric manner from the periphery of the insertion hole 26 of the partitioning wall portion 24 with their distal ends closer to each other. In the normal state (before temporarily secured), when the separation between the distal ends of the left and right pair of bracing pieces 29 and 29 is represented by La, the diameter of the tubular fixture 44 (body thereof) is represented by Lb, and the diameter of the thick portion (flange portion) 47 is represented by Lc, La<Lb<Lc (FIG. 13) or Lb<La<Lc is satisfied. Therefore, when the mounting base 42 is disposed behind the partitioning wall portion 24 so as to allow the tubular fixture 44 to project toward the front of the partitioning wall portion 24 through the insertion hole 26 of the partitioning wall portion 24 and simultaneously, the mounting base 42 is pressed against the partitioning wall portion 24 from the rear side, the bracing pieces 29 and 29 are elastically widened by the tubular fixture 44 and their distal ends are elastically pressed against the side surface of the tubular fixture 44, as shown in the drawing on the right side of FIG. 13. Eventually, the fitting projections 29a and 29a at the distal ends fit into the fitting recesses 49a and 49a of the fitting pieces 49 and 49 (which will be detailed later).

Figure 15:
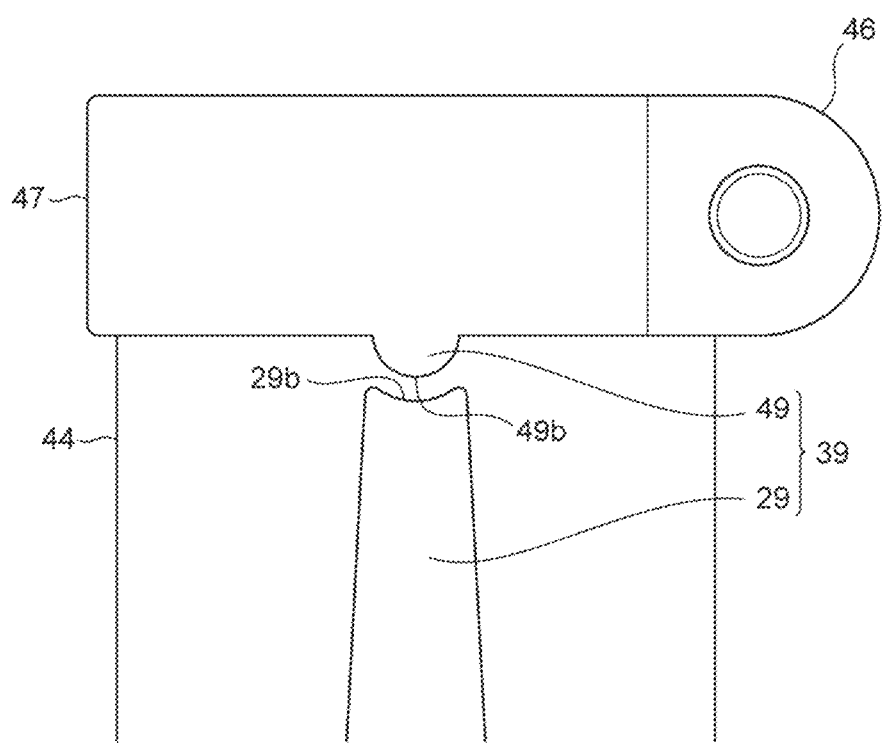
FIG. 15 is a schematic side view showing another example (example 1) of the temporarily securing mechanism illustrated in FIG. 9.
Figure 16:
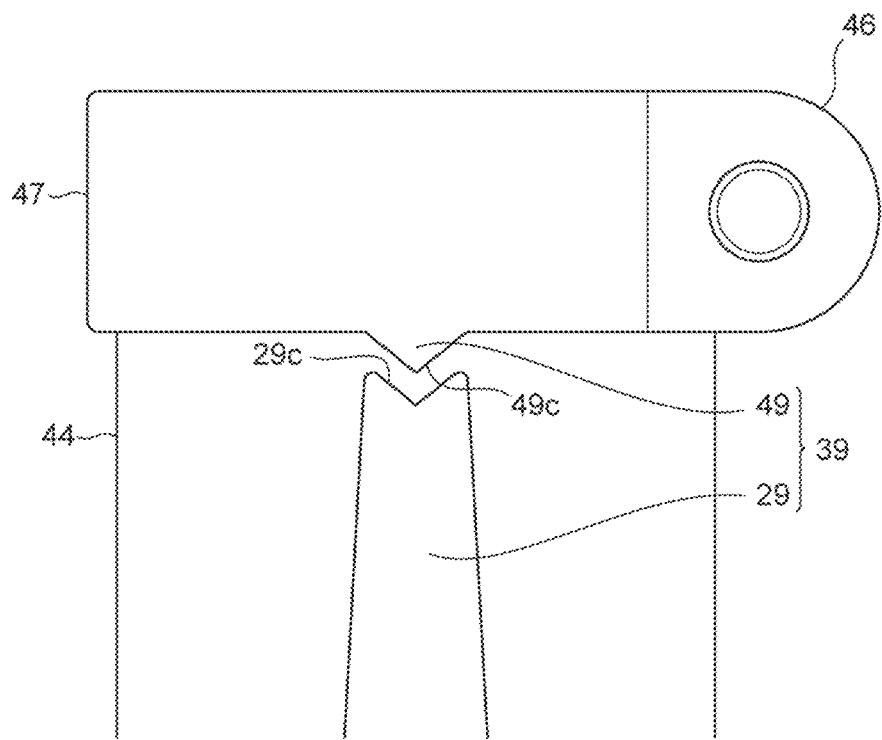
FIG. 16 is a schematic side view showing another example (example 2) of the temporarily securing mechanism illustrated in FIG. 9.

The shapes of the rear face of the fitting piece 49 and the distal end face of the bracing piece 29 may be inverted from those described above. That is, the rear face of the fitting piece 49 may form a fitting projection 49b in an elliptic arc as viewed from the side, while the distal end face of the bracing piece 29 may form a fitting recess 29b in an elliptic arc as viewed from the side that is recessed rearward (FIG. 15). Alternatively, the rear face of the fitting piece 49 may form a fitting projection 49c in a mountain shape as viewed from the side, while the distal end face of the bracing piece 29 may form a fitting recess 29c in a mountain shape as viewed from the side that is recessed rearward (FIG. 16).

Figure 17:
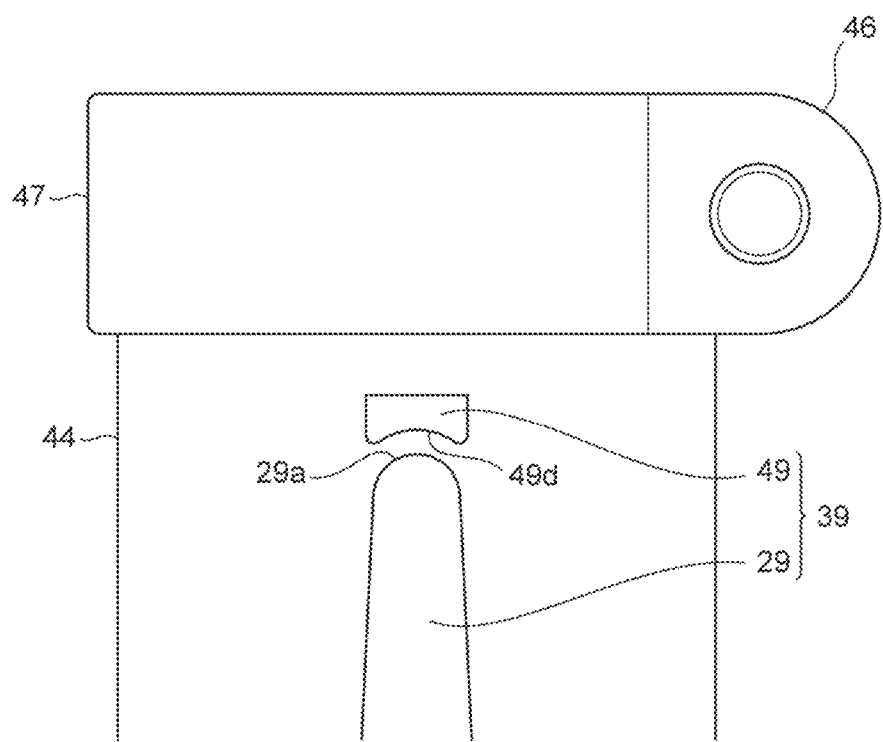
FIG. 17 is a schematic side view showing another example (example 3) of the temporarily securing mechanism illustrated in FIG. 9.
Figure 18:
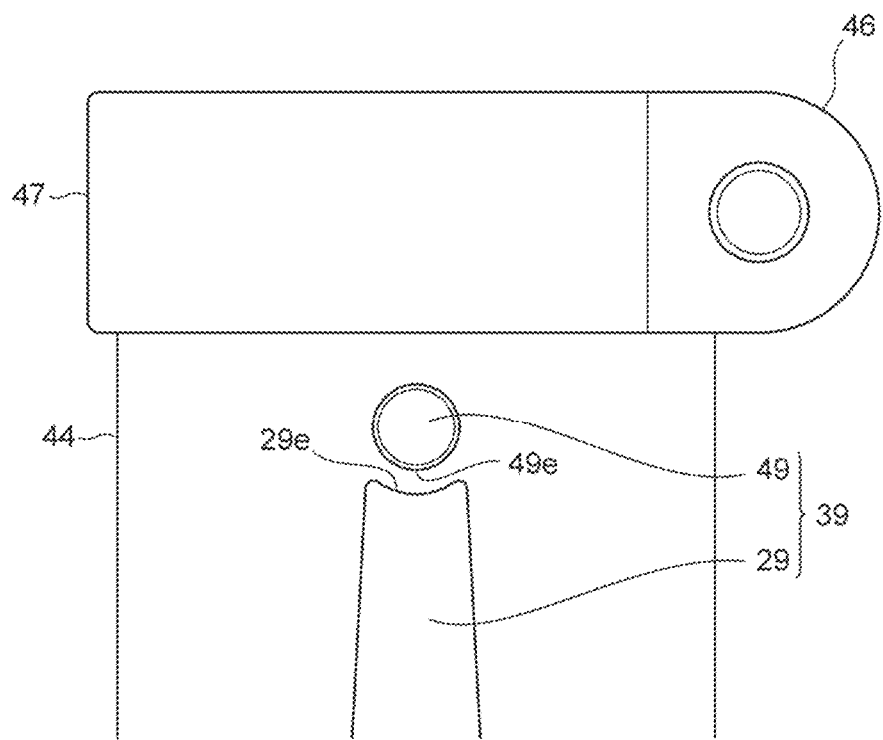
FIG. 18 is a schematic side view showing another example (example 4) of the temporarily securing mechanism illustrated in FIG. 9.

In the present example, the fitting pieces 49 and 49 are provided in the thick portion (flange portion) 47 (rear face thereof) of the tubular fixture 44, but may be provided in a portion other than the thick portion (flange portion) 47 of the tubular fixture 44. For example, the side surface of the tubular fixture 44 may be provided with the fitting piece 49 having, on its rear face, a fitting recess 49d in an elliptic arc or a mountain shape as viewed from the side that is recessed forward in the same shape as that of the present example (FIG. 17). Alternatively, the side surface of the tubular fixture 44 may be provided with the fitting piece 49 as a projection in a circular shape as viewed from the side (FIG. 18). In the example shown in FIG. 18, the rear face of the fitting piece 49 forms a fitting projection 49e in an elliptic arc as viewed from the side, while the distal end face of the bracing piece 29 forms a fitting recess 29e in an elliptic arc as viewed from the side that is recessed rearward.

The air guiding partitioning member 60 that forms the rear portion of the motor assembly 25 is made of, for example, a synthetic resin. The air guiding partitioning member 60 includes a recessed housing 63 and a partitioning plate 62. The recessed housing 63 covers at least an upper half portion of the fan case 34 (a portion on the front side of a substantially fan-shaped air guiding window 64, which will be described later) provided in the rear portion of the motor 30. The partitioning plate 62 substantially hermetically partitions between the air exhaust port 21 and an air intake port 22 provided with a predetermined interval in the longitudinal direction on a bottom 23b (in a portion behind the partitioning wall portion 24) of the body casing 23. The upper portion (on the upper side of the recessed housing 63) of the partitioning plate 62 is provided with the air guiding window 64 for delivering cooling air taken in from the air intake port 22 to the opening 36 for sucking air on the front side through a space 66 between the motor 30 and the body casing 23 (see, in particular, FIG. 4 and FIG. 19). Herein, the air guiding partitioning member 60 is securely attached to the rear side of the motor 30 by screwing one bolt 69 from the rear side of the partitioning plate 62 into the fan case 34, but may be attached to the rear side of the motor 30 through snap-fit or the like instead of or in combination with the securement with the bolt 69. The outer surface in the front end of the recessed housing 63 is provided with three recesses 68 for avoiding interference with the hooks 38 (portions projecting toward the rear from the gate-like engagement piece 37 of the fan case 34) of the short cylindrical body 31.

The shape of the partitioning plate 62 is substantially the same as that of the body casing 23 (inner periphery shape thereof). The outer periphery surface of the partitioning plate 62 faces in contact with the inner periphery surface of the body casing 23. The body casing 23 is reinforced by the partitioning plate 62 so as not to be easily dent. The rear side of the partitioning plate 62 is provided with a housing 88 for a ferrite electromagnetic wave absorber.

The rear side of the partitioning plate 62 disposed between the air exhaust port 21 and the air intake port 22 is provided with the control board 80 in the vertical direction. The control board 80 has mounted thereon a microcomputer including an FET, ROM, RAM, input/output circuit, and the like, and other necessary electronic components such as a capacitor 82 and a connector 84. In this case, the components supposed to have a high temperature in the control board 80, such as the FET and capacitor 82, are positioned in a lower portion closer to the air intake port 22. The FET is covered with a cooling fin 85.

The partitioning plate 62 of the air guiding partitioning member 60 is integrally formed with a guide member 67 with open upper and lower portions to cover the surroundings (side and rear surfaces) of the FET (cooling fin 85) and the capacitor 82, which are supposed to have a high temperature. The lower portion of the guide member 67 opens wider (than the upper portion) to allow more cooling air taken in from the air intake port 22 to flow through the FET (cooling fin 85) and the capacitor 82, which are supposed to have a high temperature.

Figure 11:
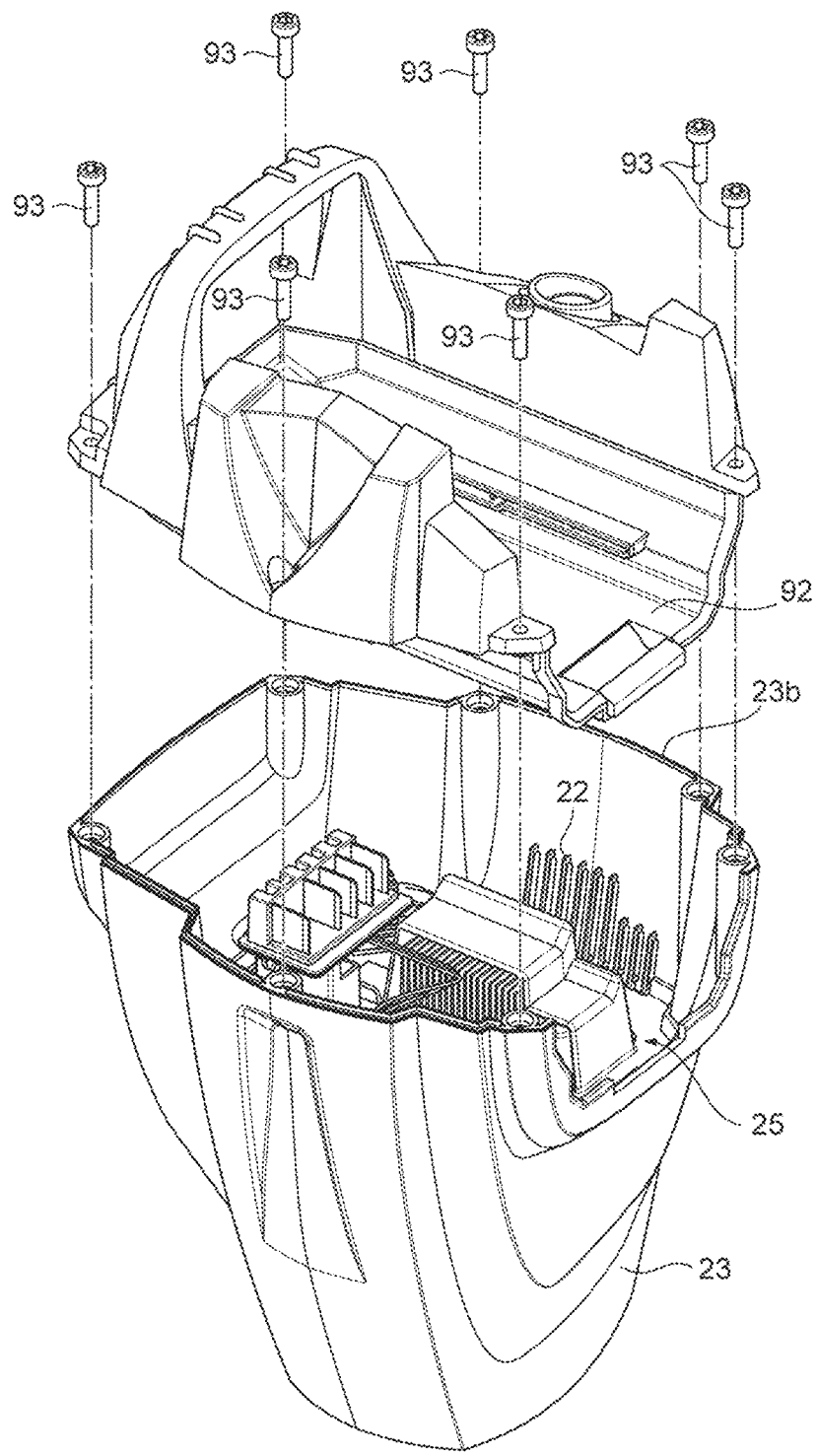
FIG. 11 is a view for explaining an assembling process (second process) of the body of the electric working machine illustrated in FIG. 1.

The rear portion (that is, rear side of the motor assembly 25) of the body casing 23 has a battery case 92 for housing (slot housing) a battery 90, securely attached with a predetermined number of bolts 93 (see FIG. 1 and FIG. 11).

[Method for Assembling Electric Working Machine]

Next, an exemplary method for assembling the electric working machine 1 (body 20 thereof) configured as described above, particularly, an exemplary process for attaching the motor assembly 25 to the body casing 23 will be described.

Figure 9:
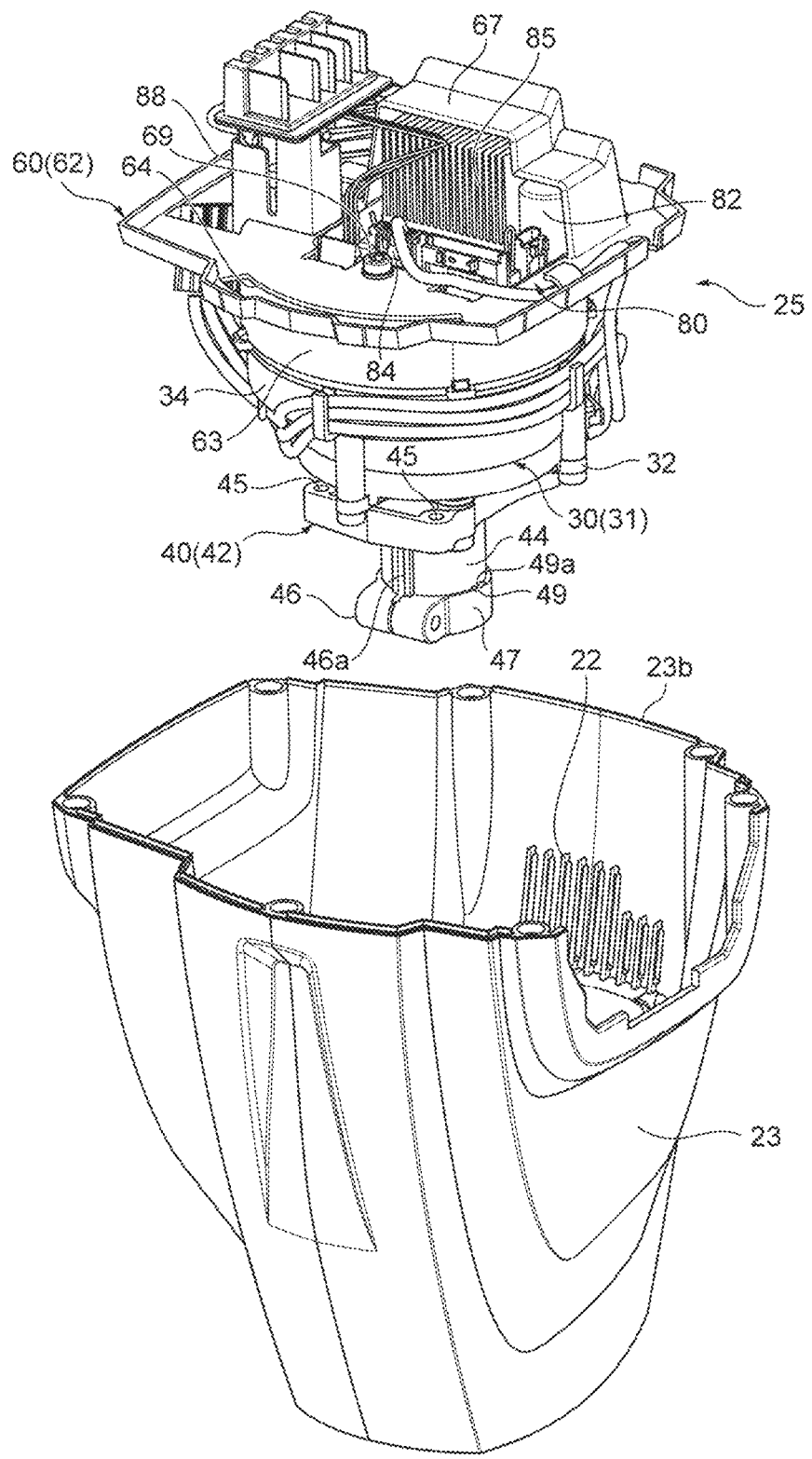
FIG. 9 is a view for explaining an assembling process (first process) of the body of the electric working machine illustrated in FIG. 1.
Figure 10:
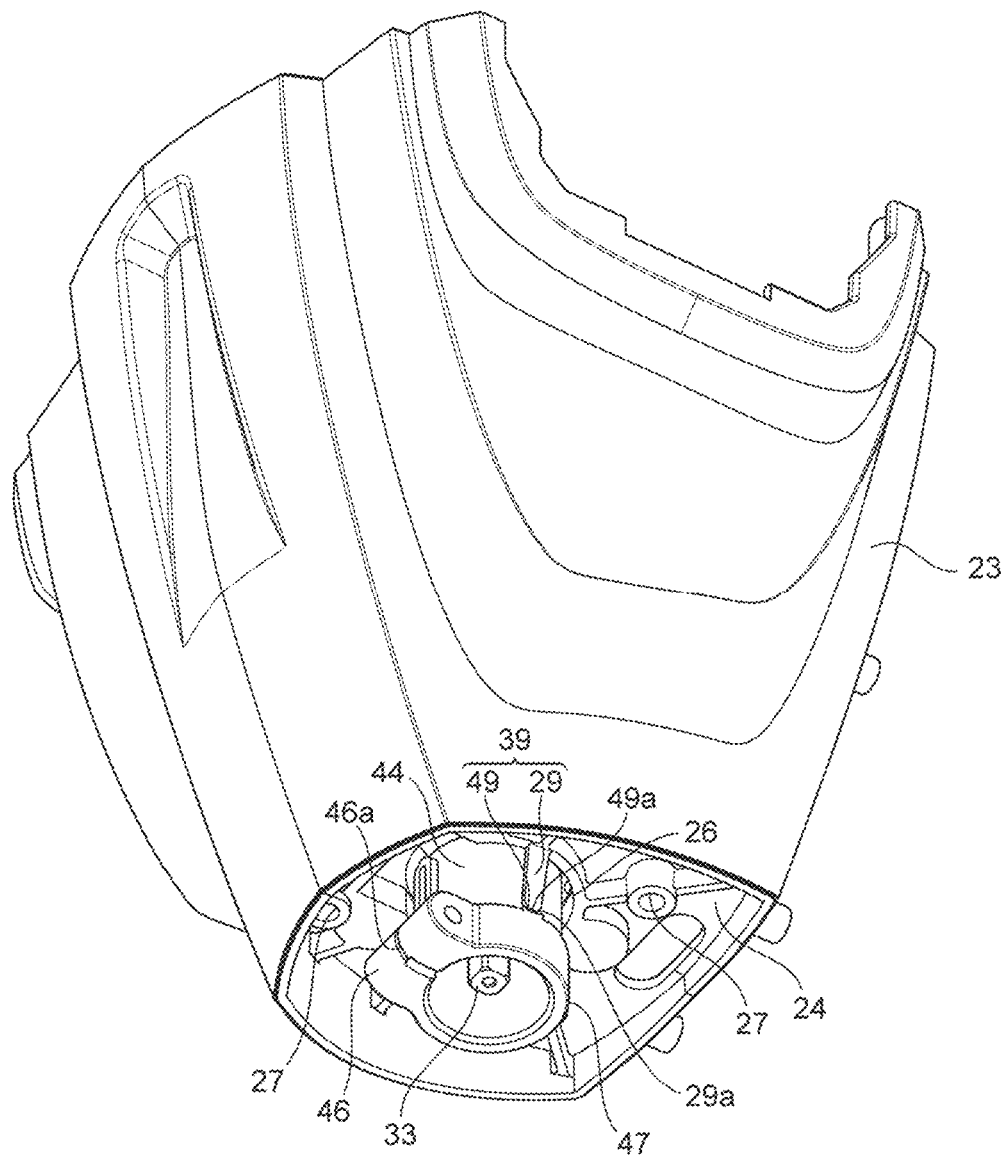
FIG. 10 is a perspective view of the body illustrated in FIG. 9 upon completion of the assembling process (first process)

First, as illustrated in FIG. 9, the body casing 23 is placed vertically with its front side positioned lower and the motor assembly 25 is placed with the rod fixture 40 side positioned lower. Then, the motor assembly 25 is relatively inserted into the body casing 23 such that the shape of the motor assembly 25 (partitioning plate 62 of the air guiding partitioning member 60 thereof) fits the inner shape of the body casing 23, and the mounting base 42 is pressed against the partitioning wall portion 24. This causes the tubular fixture 44 to elastically press to widen the bracing pieces 29 and 29 with their distal ends to be elastically pressed against the side surface of the tubular fixture 44, and the fitting projections 29a and 29a at the distal ends of the bracing pieces 29 and 29 fit into the fitting recesses 49a and 49a of the fitting pieces 49 and 49, as illustrated in the drawing on the right side of FIG. 13. In this manner, the motor assembly 25 is temporarily secured (temporarily attached) to the body casing 23 (see FIG. 10).

Figure 12:
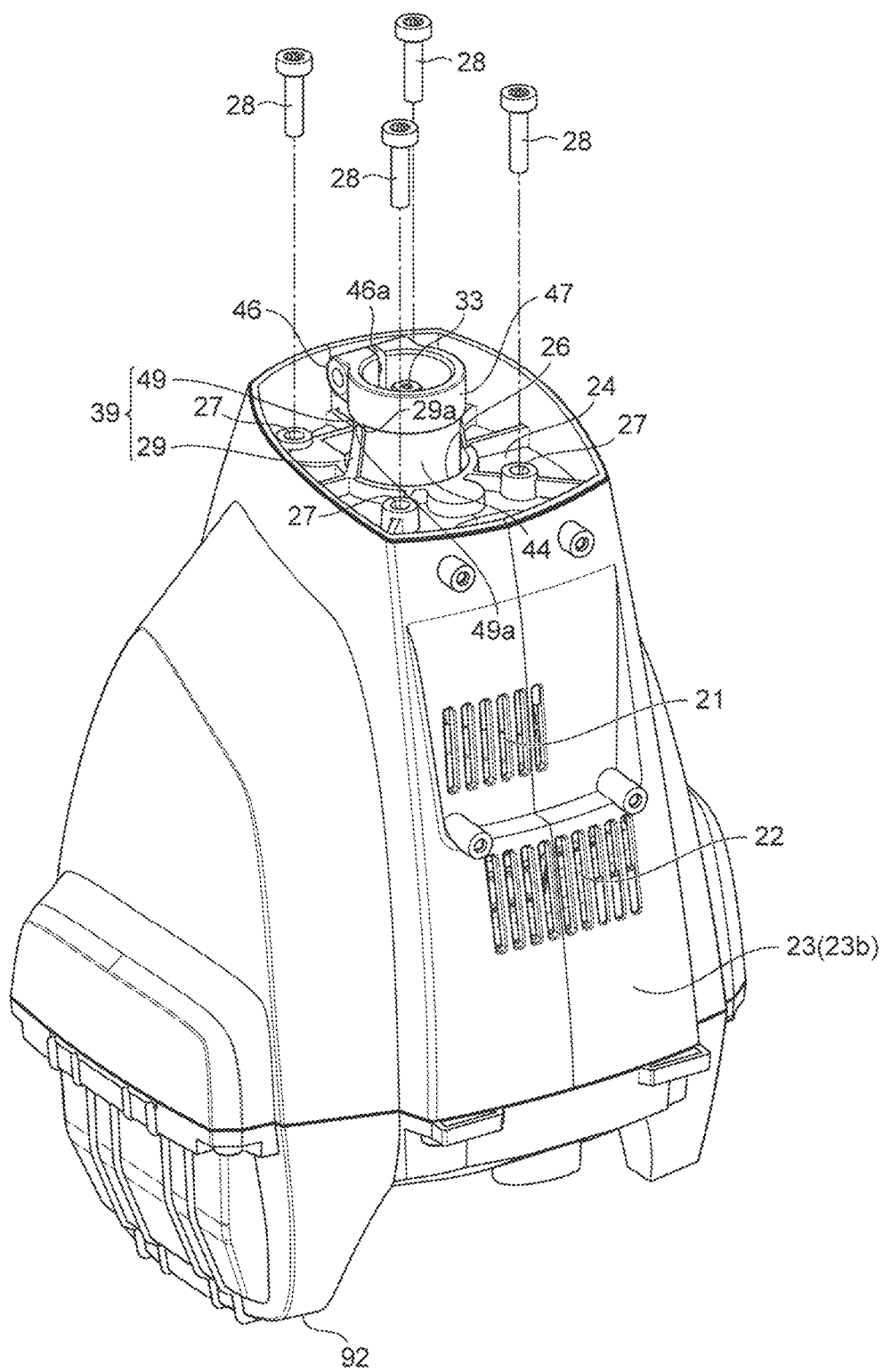
FIG. 12 is a view for explaining an assembling process (third process) of the body of the electric working machine illustrated in FIG. 1.
Figure 14:
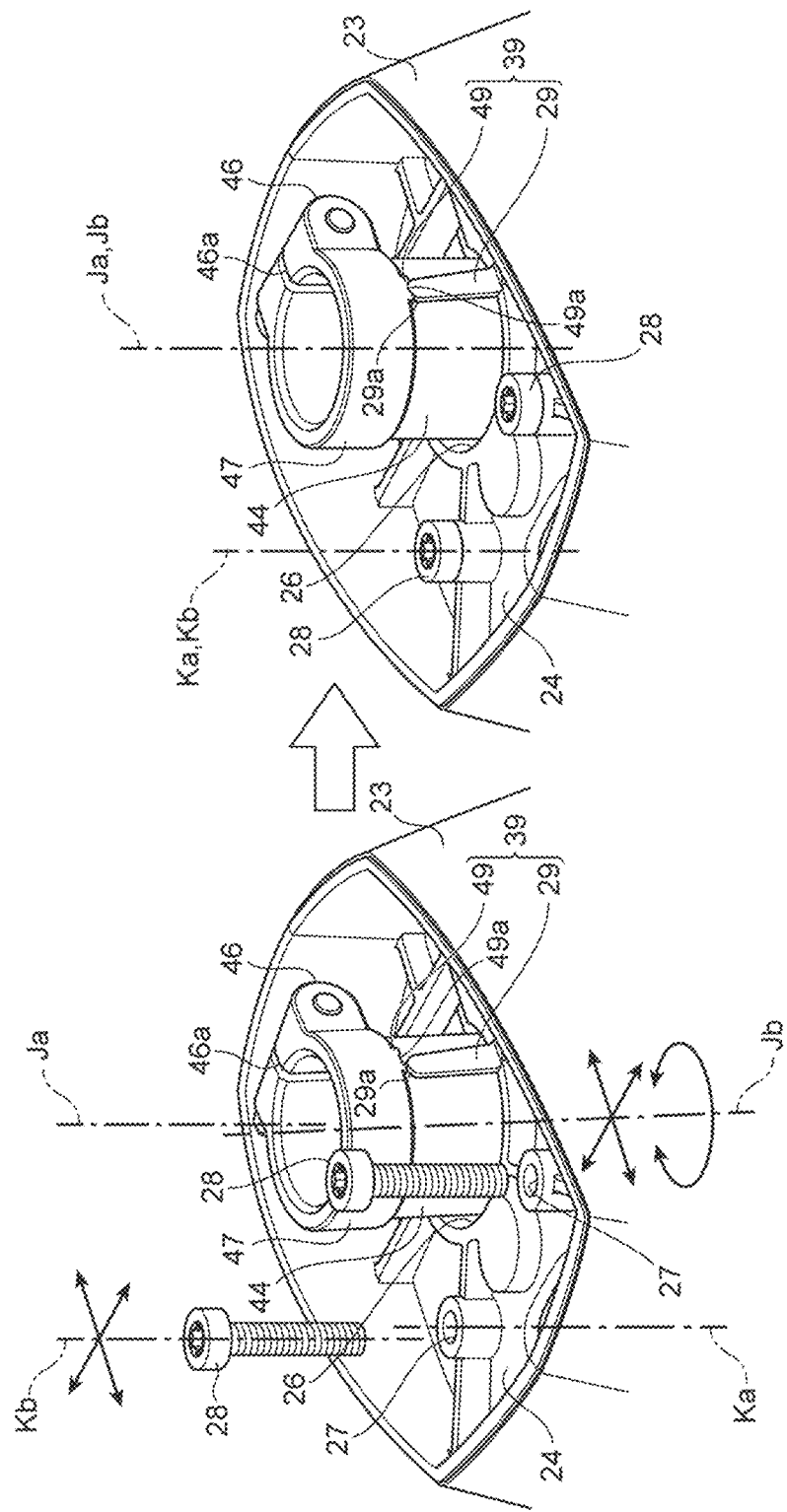
FIG. 14 shows perspective views for explaining the functional effects of the temporarily securing mechanism illustrated in FIG. 9.

In this case, as illustrated in the drawing on the left side of FIG. 14, the fitting projections 29a and 29a may not exactly fit into the fitting recesses 49a and 49a. After conducting connecting and wiring in the control board 80, with the motor assembly 25 inserted into the body casing 23 as described above, the battery case 92 is securely fastened with a predetermined number of bolts 93 to the body casing 23 as illustrated in FIG. 11, and then, when the body casing 23 (body 20) is inverted as illustrated in FIG. 12, the fitting recesses 49a and 49a and fitting projections 29a and 29a of the temporarily securing mechanism 39 tightly fit together with their sliding alignment function, as illustrated in the drawing on the right side of FIG. 14. Due to such fitting, the motor assembly 25 automatically moves in the rotating direction and two orthogonal directions on a plane along (parallel to) the partitioning wall portion 24. In this manner, an axis Jb of the tubular fixture 44 and an axis Ja of the insertion hole 26 (operating rod 11) are coaxial arranged, while an axis Ka of each of the through-holes 27 for the four bolts 28 in the partitioning wall portion 24 and an axis Kb of each of the screw holes 45 into which the bolts 28 are screwed in the mounting base 42 are coaxially arranged (that is, they are aligned (centered)). Thus, any misalignment between the body casing 23 and the motor assembly 25 can be fixed.

Therefore, when the four bolts 28 are screwed through the through-holes 27 into the screw holes 45 to secure (finally secure) the motor assembly 25 to the partitioning wall portion 24 as illustrated in FIG. 12, each of the through-holes 27 and each of the screw holes 45 are aligned in a straight line. This facilitates the screwing work.

Similarly, the tubular fixture 44 (rotary drive shaft 33 of the motor 30) and the insertion hole 26 (operating rod 11 and power transmission shaft 12) are concentrically arranged, which facilitates coupling between the tubular fixture 44 and the operating rod 11 (main operating rod 11A) and between the rotary drive shaft 33 and the power transmission shaft 12.

[Functional Effects]

As is obvious from the description above, in the electric working machine 1 of the present embodiment, the four components of the motor 30, control board 80, rod fixture 40, and air guiding partitioning member 60 are integrally formed as the motor assembly 25 as a single article. This can simplify and accelerate the assembling work.

Further, the motor assembly 25 can be temporarily secured to the body casing 23. In such temporary securing, the body casing 23 and the motor assembly 25 are automatically aligned (centered). Therefore, the operator is not required to hold the motor assembly 25 or to align components, as conventionally required. Also, elimination of the need for specific jigs can simplify the assembling work and effectively reduce the man-hours and production cost.

In addition, the motor assembly 25 can be attached to the body casing 23 only by screwing the bolts 28 from the outer side of the body casing 23. This also facilitates the assembling work.

When the motor assembly 25 needs to be taken out from the body casing 23 for maintenance or components replacement, it is only necessary to remove the bolts 28 and then widen the bracing pieces 29 with fingers or the like. The bracing pieces 29 may be reused when the removed motor assembly 25 is securely attached again. When the bracing pieces 29 are no longer needed, they can be cut away.

As described above, with the air guiding partitioning member 60 provided in the rear portion of the body casing 23, the cooling air taken in from the air intake port 22 moves upward while cooling the cooling fin 85 and capacitor 82 that are supposed to have a high temperature, flows through the air guiding window 64 in the upper portion of the partitioning plate 62 and the space 66 between the motor 30 and the body casing 23, is sucked into the motor 30 from the opening 36 for sucking air (see FIG. 7) on the front side of the motor 30, and is blown out toward the air exhaust port 21 from the air outlet 34a for exhausting air by the cooling fan, as illustrated in FIG. 19.

In the present embodiment, with the air guiding partitioning member 60 partitioning the air exhaust port 21 and the air intake port 22, a high-temperature exhaust air is unlikely to mix with a low-temperature intake air. Further, the control board 80 is disposed on the rear side of the partitioning plate 62 to allow the cooling air from the air intake port 22 to be easily blown onto the electronic components that are supposed to have a high temperature. Thus, the control board 80 can be efficiently cooled and the electronic components (such as the capacitor 82) mounted on the control board 80 are less likely to deteriorate due to the heat.

With the air exhaust port 21 and the air intake port 22 provided on the bottom 23b of the body casing 23, another advantageous effect of reducing dust and rainwater entering the body casing 23 can be obtained.

In the aforementioned embodiment, the portable electric working machine including the common machine body and exchangeable working parts (attachments) has been described as an example. However, the electric working machine is not limited thereto, and may be a common bush cutter, hedge trimmer, chain saw, or the like, having no exchangeable working parts (that is, the working part is not exchangeable).

What is claimed is:

1. An electric working machine having a longitudinal axis extending forward from a rear side of the electric working machine, the electric working machine comprising:
   a motor operable as a driving source for operation;
   a cylindrical body placed to surround the motor;
   a body casing configured to surround the cylindrical body, the body casing being formed with an air exhaust port and an air intake port arranged along the longitudinal axis so that the air exhaust port is located forward of the air intake port;
   an operating rod provided with a working part;
   a rod fixture for securely attaching the operating rod to the body casing;
   an air guiding partitioning member secured within the body casing on a rear side of the motor, the air guiding partitioning member including a partitioning plate placed between the air exhaust port and the air intake port, the partitioning plate being provided with an air guiding window for communicating a front side and a rear side of the partitioning plate;
   a fan case provided on the rear side of the motor between the motor and the partitioning plate and configured to generate an air pressure difference between the front side and the rear side of the partitioning plate, wherein the air pressure difference is generated to form a cooling air path along which cooling air flows in the body casing from the air intake port on the rear side of the partitioning plate, flows through the air guiding window into the front side of the partitioning plate from the rear side of the partitioning plate, flows forward through a space formed between the cylindrical body and the body casing, flows in the cylindrical body from a forward end of the cylindrical body, flows rearward in the cylindrical body to cool the motor, and flows out from the air exhaust port on the front side of the partitioning plate after flowing through the cylindrical body; and
   a control board disposed on the rear side of the partitioning plate.

2. The electric working machine according to claim 1, wherein the air exhaust port and the air intake port are formed in a bottom of the body casing, and the air guiding window is formed in an upper portion of the partitioning plate.

3. The electric working machine according to claim 2, further comprising electronic components mounted in a lower portion of the control board, and a guide member provided in the control board to surround the electronic components, wherein the cooling air from the air intake port flows through the electronic components inside the guide member.

4. The electric working machine according to claim 3, wherein the guide member is integrally formed with the partitioning plate.

5. The electric working machine according to claim 1, wherein the air guiding partitioning member includes a recessed housing that covers at least part of the fan case.

6. The electric working machine according to claim 1, wherein:
   the body casing has a single cylindrical body with an open front end and an open rear end and with a partitioning wall portion that partitions an inside of the body casing into a front portion and a rear portion, and
   the rod fixture includes:
      a mounting base disposed behind the partitioning wall portion and is securely fastened to the partitioning wall portion, with at least one bolt screwed from a front side to a rear side of the partitioning wall portion through a through-hole provided in the partitioning wall portion; and
      a tubular fixture for securing a proximal end of the operating rod, the tubular fixture projecting from the mounting base toward a front of the partitioning wall portion through an insertion hole provided in the partitioning wall portion.

7. An electric working machine comprising:
   a motor as a driving source for operation;
   a body casing in which the motor is disposed in a longitudinal direction;
   an operating rod provided with a working part; and
   a rod fixture for securely attaching the operating rod to the body casing,
   wherein:
   the motor, a control board for controlling the motor, the rod fixture secured to a front side of the motor, and an air guiding partitioning member secured to a rear side of the motor form a motor assembly,
   the air guiding partitioning member includes a partitioning plate that hermetically partitions between an air exhaust port and an air intake port provided with a predetermined interval in the longitudinal direction in the body casing, the partitioning plate provided with an air guiding window for delivering cooling air taken in from the air intake port to an opening for sucking air on the front side of the motor through a space between the motor and the body casing, and the control board is disposed on a rear side of the partitioning plate,
further wherein
the body casing has a single cylindrical body with an open front end and an open rear end and with a partitioning wall portion that partitions an inside of the body casing into a front portion and a rear portion, and
the rod fixture includes:
a mounting base disposed behind the partitioning wall portion and is securely fastened to the partitioning wall portion, with at least one bolt screwed from a front side to a rear side of the partitioning wall portion through a through-hole provided in the partitioning wall portion; and
a tubular fixture for securing a proximal end of the operating rod, the tubular fixture projecting from the mounting base toward a front of the partitioning wall portion through an insertion hole provided in the partitioning wall portion.

\* \* \* \* \*